United States Patent
Lambert et al.

(10) Patent No.: US 8,171,174 B2
(45) Date of Patent: May 1, 2012

(54) OUT-OF-BAND CHARACTERIZATION OF SERVER UTILIZATION VIA REMOTE ACCESS CARD VIRTUAL MEDIA FOR AUTO-ENTERPRISE SCALING

(75) Inventors: Timothy Lambert, Austin, TX (US); Sean Hart, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1140 days.

(21) Appl. No.: 11/335,294

(22) Filed: Jan. 19, 2006

(65) Prior Publication Data

US 2007/0168498 A1 Jul. 19, 2007

(51) Int. Cl.
*G06F 15/173* (2006.01)
*G06F 19/00* (2006.01)
*G06F 15/16* (2006.01)

(52) U.S. Cl. .................. 709/250; 702/186; 709/223

(58) Field of Classification Search .................. 709/250
See application file for complete search history.

(56) References Cited

U.S. PATENT DOCUMENTS

| | | | |
|---|---|---|---|
| 5,655,081 A * | 8/1997 | Bonnell et al. ............... | 709/202 |
| 5,696,701 A | 12/1997 | Burgess et al. | |
| 5,796,633 A | 8/1998 | Burgess et al. | |
| 5,819,033 A | 10/1998 | Caccavale | |
| 5,938,729 A | 8/1999 | Cote et al. | |
| 6,449,739 B1 | 9/2002 | Landan | |
| 6,564,342 B2 | 5/2003 | Landan | |
| 6,636,929 B1 * | 10/2003 | Frantz et al. ................... | 710/313 |
| 6,691,067 B1 * | 2/2004 | Ding et al. ..................... | 702/186 |
| 6,738,813 B1 | 5/2004 | Reichman | |
| 6,792,460 B2 | 9/2004 | Oulu et al. | |
| 6,874,060 B2 * | 3/2005 | Blood et al. ................... | 711/111 |
| 7,003,563 B2 * | 2/2006 | Leigh et al. .................... | 709/223 |
| 7,424,525 B2 * | 9/2008 | Guarraci et al. ............... | 709/223 |
| 7,447,818 B2 * | 11/2008 | Emerson et al. ............... | 710/260 |
| 7,457,847 B2 * | 11/2008 | Ramey .......................... | 709/217 |
| 7,478,152 B2 * | 1/2009 | Holt et al. ...................... | 709/223 |
| 2002/0194415 A1 * | 12/2002 | Lindsay et al. ................ | 710/305 |
| 2002/0198985 A1 | 12/2002 | Fraenkel et al. | |
| 2003/0028829 A1 * | 2/2003 | Slater et al. ..................... | 714/47 |
| 2003/0061401 A1 * | 3/2003 | Luciani, Jr. .................... | 709/324 |

(Continued)

OTHER PUBLICATIONS

"Compaq Remote Insight Lights-Out Edition9—User Guide", Fifth Edition, Jul. 2001, Compaq Computer Corporation.*

(Continued)

*Primary Examiner* — Ashok Patel
*Assistant Examiner* — Joseph Gazda
(74) *Attorney, Agent, or Firm* — Baker Botts L.L.P.

(57) ABSTRACT

A method for characterizing server utilization out-of-band via remote access card virtual media includes sending at least one preselected desired parameter comprising at least one of at least one performance parameter and at least one process parameter, and at least one preselected polling interval to a remote access card disposed in at least one preselected managed host server system, using a remote application running on a remote management client via at least one remote access card administrative command through an out-of-band dedicated remote access card network interface card. The method also includes connecting a plug-and-play virtual drive, having an auto-run data gathering executable, to the at least one preselected managed host server system at the at least one preselected polling interval via a plug-and-play virtual media interface between the remote access card and the at least one preselected managed host server system, using firmware of the remote access card.

14 Claims, 9 Drawing Sheets

U.S. PATENT DOCUMENTS

| | | | |
|---|---|---|---|
| 2003/0110351 A1* | 6/2003 | Blood et al. | 711/111 |
| 2003/0126226 A1* | 7/2003 | Ramey | 709/215 |
| 2003/0131113 A1* | 7/2003 | Reeves et al. | 709/229 |
| 2003/0131246 A1* | 7/2003 | Reeves et al. | 713/182 |
| 2004/0186837 A1* | 9/2004 | Lambert et al. | 707/10 |
| 2004/0267918 A1* | 12/2004 | Guarraci et al. | 709/223 |
| 2005/0125519 A1* | 6/2005 | Yang et al. | 709/223 |
| 2006/0039468 A1* | 2/2006 | Emerson et al. | 375/240.01 |
| 2006/0041755 A1* | 2/2006 | Pemmaraju | 713/182 |
| 2006/0072531 A1* | 4/2006 | Ewing et al. | 370/338 |
| 2006/0245533 A1* | 11/2006 | Rostampour | 375/377 |
| 2007/0011507 A1* | 1/2007 | Rothman et al. | 714/718 |
| 2007/0055740 A1* | 3/2007 | Luciani et al. | 709/217 |
| 2007/0055780 A1* | 3/2007 | Cartes et al. | 709/227 |

OTHER PUBLICATIONS

Compaq, "Remote Insight Lights-Out Edition II—User Guide", Part No. 232664-001, May 2002 (First Edition).*

Compaq, "Compaq Remote Insight Lights-Out Edition II—Updated Information Booklet", Part No. 302991-001, Jul. 2002 (First Edition).*

"Compaq Remote Insight Lights-Out Edition II—Updated Information Booklet", Part No. 302991-001, Jul. 2002 (First Edition), Compaq, pp. 1-15.*

"Remote Insight Lights-Out Edition II—User Guide", Part No. 232664-001, May 2002, (First Edith), Compaq, pp. 1-167.*

Hewlett-Packard Co., hp Guardian Performance Analyzer Software Product Description, 2002, available at http://h20223.www2.hp.com/NonStopComputing/downloads/GuardianPerfAnalyzer.pdf.

Pan et al., Remote Management with Virtual Media in the DRAC 4, Oct. 2004, pp. 30-34, available at http://www.dell.com/downloads/global/power/ps4q04-20040105-Pan.pdf.

* cited by examiner

OUT-OF-BAND CHARACTERIZATION OF SERVER UTILIZATION VIA REMOTE ACCESS CARD VIRTUAL MEDIA FOR AUTO-ENTERPRISE SCALING

TECHNICAL FIELD OF THE INVENTION

This invention relates generally to information handling systems and, more particularly, to a method for characterizing server utilization out-of-band via remote access card virtual media.

BACKGROUND OF THE INVENTION

As the value and use of information continues to increase, individuals and businesses continually seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems, such as computers, including servers and workstations, are often grouped in clusters to perform specific tasks. A server cluster is a group of independent servers that is managed as a single system and is characterized by higher availability, manageability, and scalability, as compared with groupings of unmanaged host server systems. A server cluster typically involves the configuration of a group of independent servers such that the servers appear in the network as a single machine or unit. Server clusters are often managed as a single system, share a common namespace on the network, and are designed specifically to tolerate component failures and to support the addition or subtraction of components in the cluster in a transparent manner. At a minimum, a server cluster includes two or more servers that are connected to one another by a network. The server cluster may include software driven methods by which each client of the server cluster may access the data stored in or controlled by a server of the server cluster. One software application that is used to manage the operation of a server cluster is Microsoft Cluster Service (MSCS), which is produced by the Microsoft Corporation of Redmond, Wash.

Customers and/or users of servers may understand the advantages of using scalable enterprise servers, but often do not have much insight into how their server computing power and/or capacity are being utilized and also when and where scaling may need to occur within their infrastructure. Customers and/or users want insight into how well each of their servers are being utilized and easily to identify and/or foresee bottlenecks in order to scale their hardware investments more effectively. At the same time, customers and/or users do not want to interfere with the main functions and/or network utilization of their servers. In addition, profiling active and/or runaway processes and/or idle systems and causing alerts may help administrators proactively to address issues and/or optimize the computing power of their servers.

However, conventional clustered servers typically have no way to profile system utilization via out-of-band server management functionality so that, consequently, conventional performance characterization of conventional clustered servers uses and/or interrupts the in-band network resources. This ability to profile system utilization would be useful for administrators who manage numerous servers and want an automated mechanism for knowing the utilization of each one over time. This would aid in better function and/or load balancing to optimize the overall infrastructure's utilization as well as understanding better when new servers and/or upgrades would be needed to relieve recurring bottlenecks. Many conventional off-the-shelf performance monitor applications exist, but all of these operate through in-band network interfaces and involve processes always running on the host server.

SUMMARY OF THE INVENTION

According to various illustrative embodiments of the present invention, a method for characterizing server utilization out-of-band via remote access card virtual media in one aspect includes sending at least one preselected desired parameter comprising at least one of at least one performance parameter and at least one process parameter, and at least one preselected polling interval to a remote access card disposed in at least one preselected managed host server system, using a remote application running on a remote management client via at least one remote access card administrative command through an out-of-band dedicated remote access card network interface card. The method also includes connecting a plug-and-play virtual drive, having an auto-run data gathering executable, to the at least one preselected managed host server system at the at least one preselected polling interval via a plug-and-play virtual media interface between the remote access card and the at least one preselected managed host server system, using firmware of the remote access card, the plug-and-play virtual drive emulating at least one of a remote drive disposed in the remote management client and a local virtual key disposed in the remote access card. The method also includes collecting the at least one preselected desired parameter from the at least one preselected managed host server system at the at least one preselected polling interval, using the auto-run data gathering executable that writes to the at least one of the remote drive and the local virtual key at least one result of the collection of the at least one preselected desired parameter.

According to various illustrative embodiments of the present invention, a method for characterizing server utilization out-of-band via remote access card virtual media in another aspect includes prompting a user to select at least one desired parameter comprising at least one of at least one performance parameter and at least one process parameter, at least one polling interval, and at least one managed host server system to observe, using a remote application running on a remote management client. The method also includes sending the selected at least one desired parameter and the selected at least one polling interval to a remote access card disposed in the selected at least one managed host server system, using the remote application running on the remote management client via at least one remote access card administrative command through an out-of-band dedicated remote access card network interface card. The method also includes connecting a plug-and-play virtual drive, having an auto-run data gathering executable, to the selected at least one managed host server system at the selected at least one polling interval via a plug-and-play virtual media interface between the remote access card and the selected at least one managed host server system, using firmware of the remote access card, the plug-and-play virtual drive emulating at least one of a remote drive disposed in the remote management client and a local virtual key disposed in the remote access card. The method also includes collecting the selected at least one desired parameter from the selected at least one managed host server system at the selected at least one polling interval, using the auto-run data gathering executable that writes to the at least one of the remote drive and the local virtual key at least one result of the collection of the at least one preselected desired parameter. The method also includes detecting the at least one result of the collection of the selected at least one desired parameter written to the at least one of the remote drive and the local virtual key, using the remote application.

According to various illustrative embodiments of the present invention, a method for characterizing server utilization out-of-band via remote access card virtual media for auto-enterprise scaling in yet another aspect includes prompting a user to select at least one desired parameter comprising at least one of at least one performance parameter and at least one process parameter, at least one polling interval, and at least one managed host server system to observe, using a remote application running on a remote management client. The method also includes sending the selected at least one desired parameter and the selected at least one polling interval to a remote access card disposed in the selected at least one managed host server system, using the remote application running on the remote management client via at least one remote access card administrative command through an out-of-band dedicated remote access card network interface card. The method also includes connecting a plug-and-play virtual drive, having an auto-run data gathering executable, to the selected at least one managed host server system at the selected at least one polling interval via a plug-and-play virtual media interface between the remote access card and the selected at least one managed host server system, using firmware of the remote access card, the plug-and-play virtual drive emulating at least one of a remote drive disposed in the remote management client and a local virtual key disposed in the remote access card. The method also includes collecting the selected at least one desired parameter from the selected at least one managed host server system at the selected at least one polling interval, using the auto-run data gathering executable that writes a performance snapshot text file to the at least one of the remote drive and the local virtual key at least one result of the collection of the at least one preselected desired parameter. The method also includes repeating the collection of the selected at least one desired parameter from the selected at least one managed host server system at the selected at least one polling interval, using the auto-run data gathering executable, using firmware of the remote access card until the remote application sends at least one remote access card administrative command to stop collecting the selected at least one desired parameter from the selected at least one managed host server system. The method also includes detecting the performance snapshot text file of the at least one result of the collection of the selected at least one desired parameter written to the at least one of the remote drive and the local virtual key, using the remote application that copies and parses the performance snapshot text file of the at least one result of the collection of the selected at least one desired parameter for at least one relevant field and populates at least one of a spreadsheet and a database for at least one of plotting purposes and analysis purposes. The method also includes analyzing at least one trend from the at least one of the spreadsheet and the database to predict when the selected at least one managed host server system should be scaled and to link to a vendor for at least one sales recommendation.

The method for characterizing server utilization out-of-band via remote access card virtual media disclosed herein is advantageous in providing insight to customers and/or users of servers, who understand the advantages of using scalable enterprise servers, about how their server computing power and/or capacity are being utilized and also when and where scaling may need to occur within their infrastructure. The method for characterizing server utilization out-of-band via remote access card virtual media disclosed herein is further advantageous in providing insight to customers and/or users of servers into how well each of their servers are being utilized and enabling customers and/or users of servers easily to identify and/or foresee bottlenecks in order to scale their hardware investments more effectively. The method for characterizing server utilization out-of-band via remote access card virtual media disclosed herein is also advantageous to customers and/or users of servers by not interfering with the main functions and/or network utilization of their servers. In addition, the method for characterizing server utilization out-of-band via remote access card virtual media disclosed herein is advantageous in allowing profiling of active and/or runaway processes and/or idle systems and in causing alerts that may help administrators proactively to address issues and/or optimize the computing power of their servers.

Moreover, the method for characterizing server utilization out-of-band via remote access card virtual media disclosed herein is advantageous in allowing profiling of system utilization via out-of-band server management functionality so that, consequently, performance characterization of clustered servers does not use and/or does not interrupt the in-band network resources. This ability to profile system utilization via out-of-band server management functionality is useful for administrators who manage numerous servers and want an automated mechanism for knowing the utilization of each one over time. This aids in better function and/or load balancing to optimize the overall infrastructure's utilization as well as understanding better when new servers and/or upgrades would be needed to relieve recurring bottlenecks. Unlike existing conventional off-the-shelf performance monitor applications, which all operate through in-band network interfaces and involve processes always running on the host server, the method for characterizing server utilization out-of-band via remote access card virtual media disclosed herein is further advantageous in operating through out-of-band network interfaces and/or involving processes that do not always run of the managed host server system. Other technical advantages will be apparent to those of ordinary skill in the art having the benefit of the present disclosure and in view of the following specification, claims, and drawings.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein.

It is to be noted, however, that the appended drawings illustrate only typical embodiments of the present invention and are, therefore, not to be considered limiting of the scope of the present invention, as the present invention may admit to other equally effective embodiments.

DETAILED DESCRIPTION OF EXEMPLARY EMBODIMENTS OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
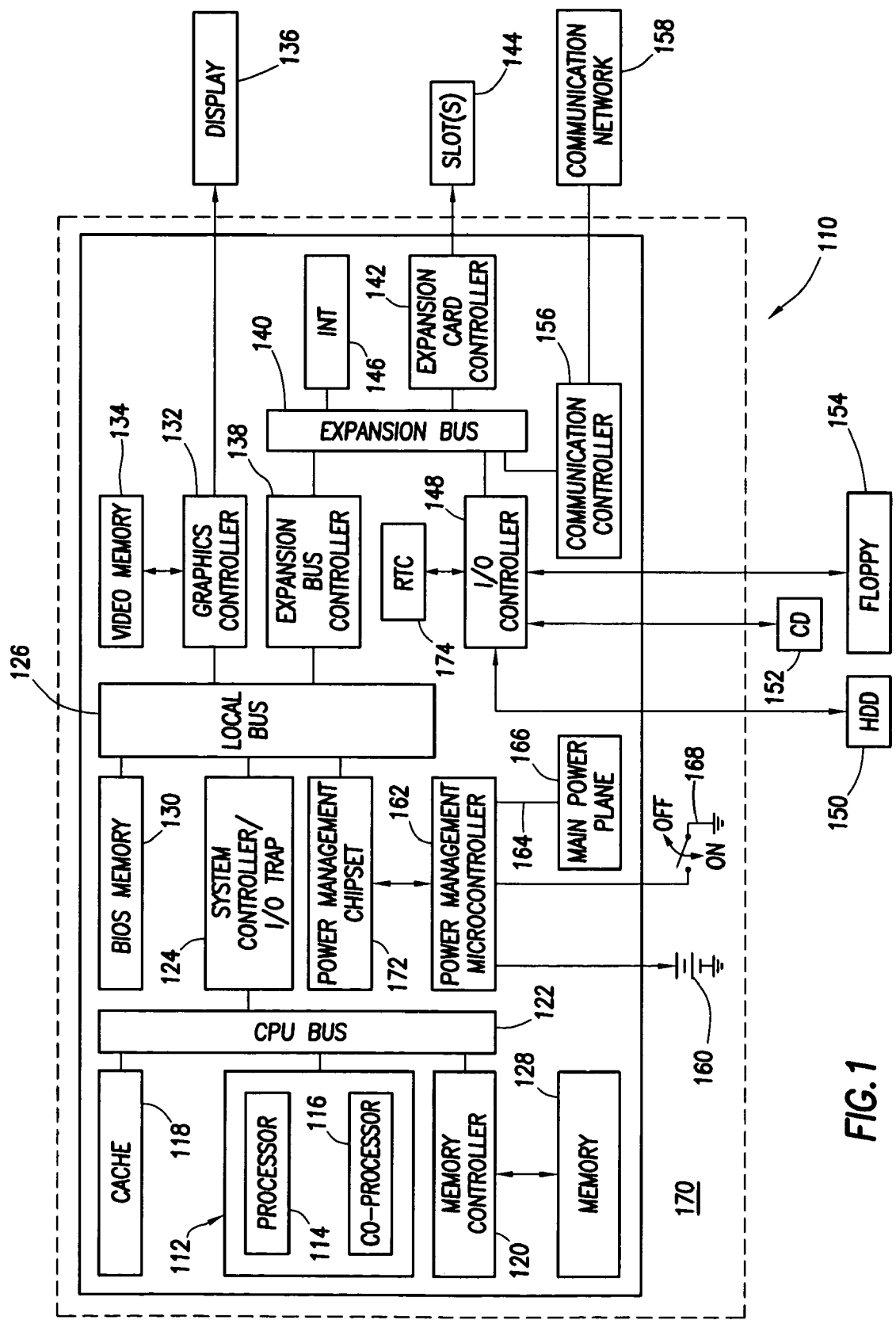
FIG. 1 schematically illustrates a block diagram showing an information handling system, according to teachings of the present disclosure.

Referring first to FIG. 1, a block diagram of an information handling system 110 is shown, according to teachings of the present disclosure. The information handling system 110 or the computer system 110 preferably may include at least one microprocessor or central processing unit (CPU) 112. The CPU 112 may include a processor 114 for handling integer operations and a co-processor 116 for handling floating point operations. The CPU 112 may preferably be coupled to a cache 118 and a memory controller 120 via a CPU bus 122. A system controller input/output (I/O) trap 124 preferably may couple the CPU bus 122 to a local bus 126 and may be generally characterized as part of a system controller.

A main memory 128 of dynamic random access memory (DRAM) modules may preferably be coupled to the CPU bus 122 by the memory controller 120. The main memory 128 may be divided into one or more areas such as a system management mode (SMM) memory area (not expressly shown).

A basic input/output system (BIOS) memory 130 may also preferably be coupled to the local bus 126. A FLASH memory or other nonvolatile memory may be used as the BIOS memory 130. A BIOS program (not expressly shown) may typically be stored in the BIOS memory 130. The BIOS program preferably may include software that facilitates interaction with and between the information handling system 110 devices such as a keyboard (not expressly shown), a mouse (not expressly shown), and/or one or more I/O devices. The BIOS memory 130 may also store system code (note expressly shown) operable to control a plurality of basic information handling system 110 operations.

A graphics controller 132 may preferably be coupled to the local bus 126 and to a video memory 134. The video memory 134 may preferably be operable to store information to be displayed on one or more display panels 136. The display panel 136 may be an active matrix or passive matrix liquid crystal display (LCD), a cathode ray tube (CRT) display, and/or another display technology. In selected applications, uses and/or instances, the graphics controller 132 may also be coupled to an integrated display, such as in a portable information handling system implementation.

A bus interface controller or expansion bus controller 138 may preferably couple the local bus 126 to an expansion bus 140. In various illustrative embodiments, the expansion bus 140 may be configured as an industry standard architecture (ISA) bus. Other buses, for example, a peripheral component interconnect (PCI) bus, may also be used.

In certain information handling system 110 embodiments, an expansion card controller 142 may also be included and may preferably be coupled to the expansion bus 140 as shown in FIG. 1. The expansion card controller 142 may preferably be coupled to a plurality of information handling system 110 expansion slots 144. The expansion slots 144 may be configured to receive one or more computer components (not expressly shown) such as an expansion card (e.g., modems, fax cards, communications cards, and/or other I/O devices).

An interrupt request generator 146 may also preferably be coupled to the expansion bus 140. The interrupt request generator 146 may preferably be operable to issue an interrupt service request over a predetermined interrupt request line in response to receipt of a request to issue an interrupt instruction from the CPU 112.

An I/O controller 148, often referred to as a super I/O controller 148, may also preferably be coupled to the expansion bus 140. The I/O controller 148 may preferably interface to an integrated drive electronics (IDE) hard drive device (HDD) 150, a compact disk-read only memory (CD-ROM) drive 152, and/or a floppy disk drive (FDD) 154. Other disk drive devices (not expressly shown) that may be interfaced to the I/O controller 148 include a removable hard drive, a zip drive, a CD-RW (compact disk-read/write) drive, and a CD-DVD (compact disk—digital versatile disk) drive.

A communication controller 156 may preferably be provided and may enable the information handling system 110 to communicate with a communication network 158, for example, an Ethernet network. The communication network 158 may include a local area network (LAN), a wide area network (WAN), the Internet, an Intranet, wireless broadband, and the like. The communication controller 156 may be employed to form a network interface for communicating with other information handling systems (not expressly shown) coupled to the communication network 158.

As shown in FIG. 1, the information handling system 110 may preferably include a power supply 160, which may provide power to the many components and/or devices that form the information handling system 110. The power supply 160 may be a rechargeable battery, such as a nickel metal hydride (NiMH) or a lithium ion battery, when the information handling system 110 is embodied as a portable or notebook computer, an A/C (alternating current) power source, an uninterruptible power supply (UPS) or other power source.

The power supply 160 may preferably be coupled to a power management microcontroller 162. The power management microcontroller 162 may preferably control the distribution of power from the power supply 160. More specifically, the power management microcontroller 162 may preferably include a power output 164 coupled to a main power plane 166 that may supply power to the CPU 112 as well as to other information handling system 110 components. The power management microcontroller 162 may also be coupled to a power plane (not expressly shown) operable to supply power to an integrated panel display (not expressly shown), as well as to additional power delivery planes that preferably may be included in the information handling system 110.

The power management microcontroller 162 may preferably monitor a charge level of an attached battery and/or a UPS to determine when and when not to charge the battery or the UPS. The power management microcontroller 162 may preferably also be coupled to a main power switch 168, which the user may actuate to turn the information handling system 110 on and off. While the power management microcontroller 162 may power down one or more portions or components of the information handling system 110, for example, the CPU 112, the display 136, and/or the HDD 150, and the like, when not in use to conserve power, the power management microcontroller 162 itself may preferably be substantially always coupled to a source of power, preferably the power supply 160.

A computer system, a type of information handling system 110, may also include a power management chip set 172. The power management chip set 172 may preferably be coupled to the CPU 112 via the local bus 126 so that the power management chip set 172 may receive power management and control commands from the CPU 112. The power management chip set 172 may preferably be connected to a plurality of individual power planes operable to supply power to respective components of the information handling system 110, for example, the HDD 150, the FDD 154, and the like. In this manner, the power management chip set 172 may preferably act under the direction of the CPU 112 to control the power supplied to the various power planes and components of a system.

A real-time clock (RTC) 174 may also be coupled to the I/O controller 148 and the power management chip set 172. Inclusion of the real-time clock (RTC) 174 may permit timed events and/or alarms to be transmitted to the power management chip set 172. The real-time clock (RTC) 174 may be programmed to generate an alarm signal at a predetermined time as well as to perform other operations.

The information handling system 110 may be associated with a chassis 170. Generally, the chassis 170 may be referred to as the computer case and/or case that encloses the some of the components within the information handling system 110. However, other components such as the CD drive 152, the floppy drive 154 and/or the HDD 150, may be placed internal to the chassis 170 and/or separately from the chassis 170 in a stand-alone enclosure (described below in more detail) and/or connected in series.

Figure 2:
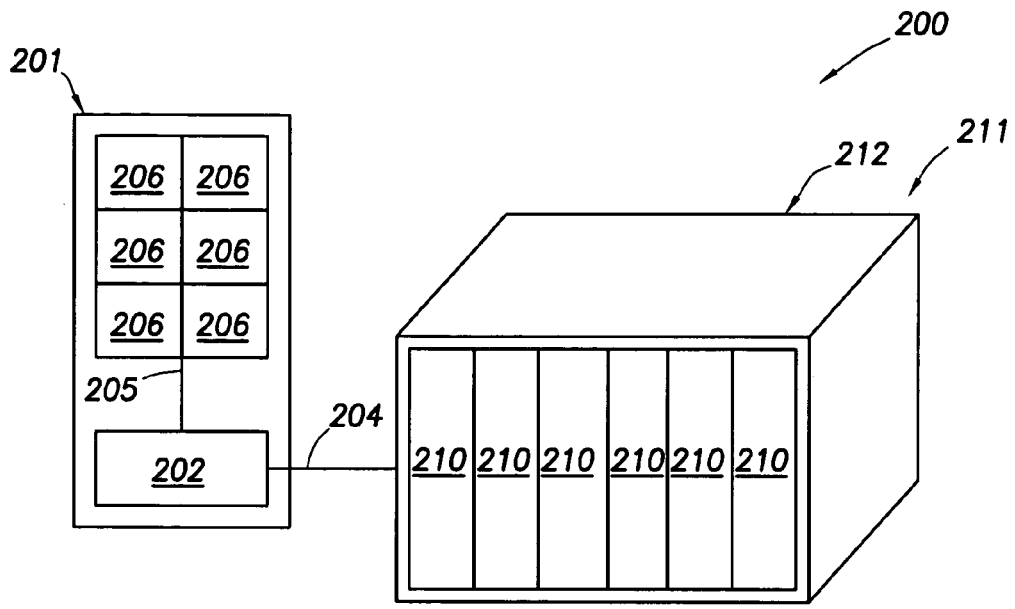
FIG. 2 schematically illustrates a block diagram showing an exemplary embodiment of a storage system including a controller mounted on an internal backplane having hard disk drives (HDD) and a stand-alone enclosure coupled to the controller having additional HDD connected via a SCSI bus, according to teachings of the present disclosure.
Figure 3:
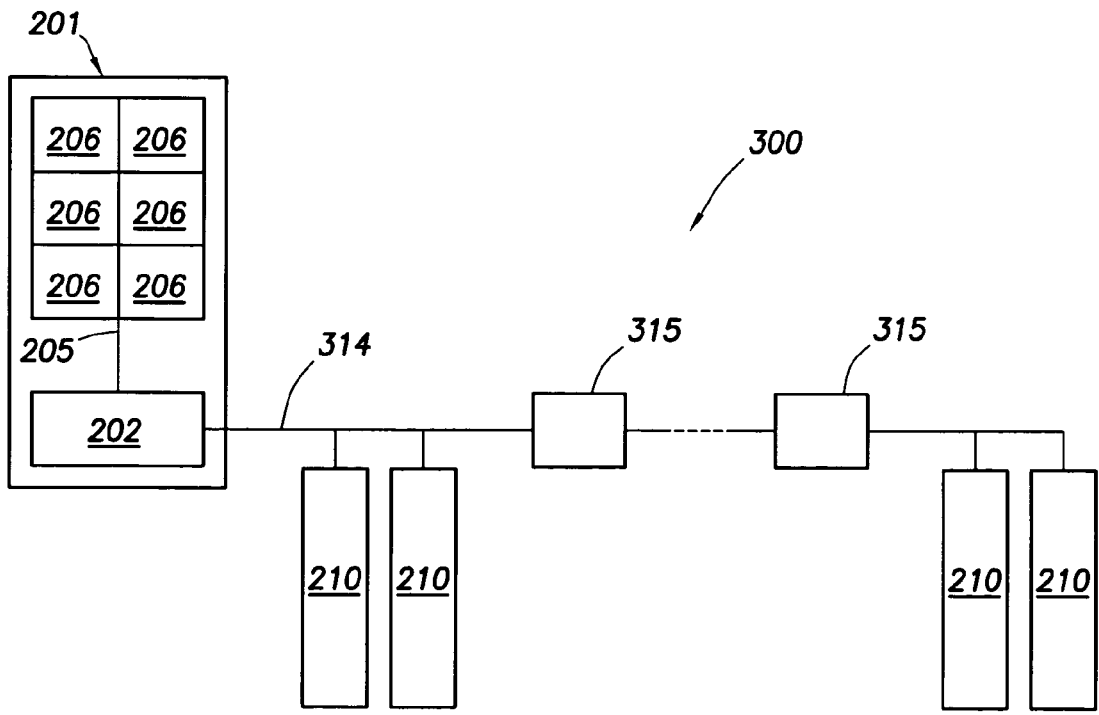
FIG. 3 schematically illustrates a block diagram showing an exemplary embodiment of a storage system including a controller mounted on an internal backplane having hardware devices such as HDD connected via a point-to-point link, according to teachings of the present disclosure.

As shown in FIGS. 2 and 3, for example, one or more computer components may be communicatively connected to the information handling system 110 via a bus 204, as described below in more detail, or through a point-to-point link 314. In some embodiments, the information handling system 110 may include a storage system 200 (described below in more detail) that uses a small computer system interface (SCSI), Fibre Channel, serial attached SCSI (SAS), and/or other standard for communications between components and/or devices and the system. One example of a point-to-point link in an SAS storage subsystem may include a group of links also known as a "fabric" that uses a Fibre Channel standard for interfacing between controllers and drives.

FIGS. 2 and 3 are block diagrams showing various exemplary embodiments of the storage system 200, including a small computer system interface (SCSI) storage subsystem 211 and a serial attached SCSI (SAS) storage subsystem 300, respectively. Each storage subsystem 200 may include a controller 202 mounted on an internal backplane 201 having hard disk drives (HDDs) 206. The SCSI storage subsystem 211 may further include a stand-alone enclosure 212 that may include input/output (I/O) expanders coupled to a controller 202 having additional SCSI devices such as the HDDs 210 connected via a SCSI bus 204. The SAS storage subsystem 300 may further include additional SCSI devices such as the HDDs 210 interconnected via the point-to-point link 314. In various illustrative embodiments, the SAS storage subsystem 300 may further include one or more expanders 315 that may be operable to regenerate, reshape, and/or retransmit a SCSI signal to additional SCSI devices such as the HDDs 210 interconnected via the point-to-point link 314.

A SCSI/SAS storage system such as storage system 200 may include a plurality of hardware and/or SCSI devices such as the internal hard disk drives (HDDs) 206 and the external hard disk drives (HDDs) 210 that are connected via I/O expanders. Other examples of SCSI devices may include tape drives (not expressly shown) and/or compact disk drives (not expressly shown).

The I/O expanders may allow the SCSI devices to connect to the storage system 200. The I/O expanders may include the SCSI expanders 315 that may include expander chips (not expressly shown), the internal backplane 201 and/or the enclosure 212 that may have connections for the SCSI devices to communicate with the storage system 200 via a SCSI bus such as the internal bus 205 and the external bus 204. Useful exemplary enclosures 212 may include a PowerVault 220 system and/or a PowerVault 210 system manufactured by Dell, Inc. Because the SCSI devices may reside at different locations and/or configurations within the storage system 200, the controller 202 may be used to direct communications to the address associated with each SCSI device.

The SAS storage subsystem 300 may further include one or more SCSI expanders 315 that may be used to link and/or interconnect with one or more hardware devices such as the HDD 210. However, there may not necessarily be one SCSI expander for each hardware device such as the hard disk drive (HDD) 210.

Each hardware and/or SCSI device within the storage system 200 may be represented as a SCSI target. Each SCSI device may include an address for communications between a processor and memory (not expressly shown) in the storage system 200 via an I/O controller such as the controller 202 shown on the internal backplane 201. The controller 202 may direct information between the SCSI devices via the internal bus 205 and/or the external bus 204.

The connections on SCSI devices may be interchangeable such that an internal SCSI device such as the internal HDD 206 may be placed in the enclosure 212, having an I/O expander. Similarly, the external HDD 210 may connect to the internal backplane 201 in lieu of the internal HDD 206.

Even though the SCSI devices may physically connect at the different locations, compatibility issues may arise such as the SCSI device may not be supported. Thus, the controller 202 may perform a scan for devices placed on interconnections such as the bus 204 and the point-to-point link 314 for devices associated with storage system 200 to identify potential compatibility issues. For example, compatibility issues may arise between a combination of the SCSI controller and an SCSI hardware device, the SCSI controller and an attached enclosure, the enclosure and an SCSI device, and the SCSI device and another SCSI device. Furthermore, firmware compatibility issues may arise such as one or more of the devices may not have the most up-to-date revision of the appropriate respective firmware.

Figure 4:
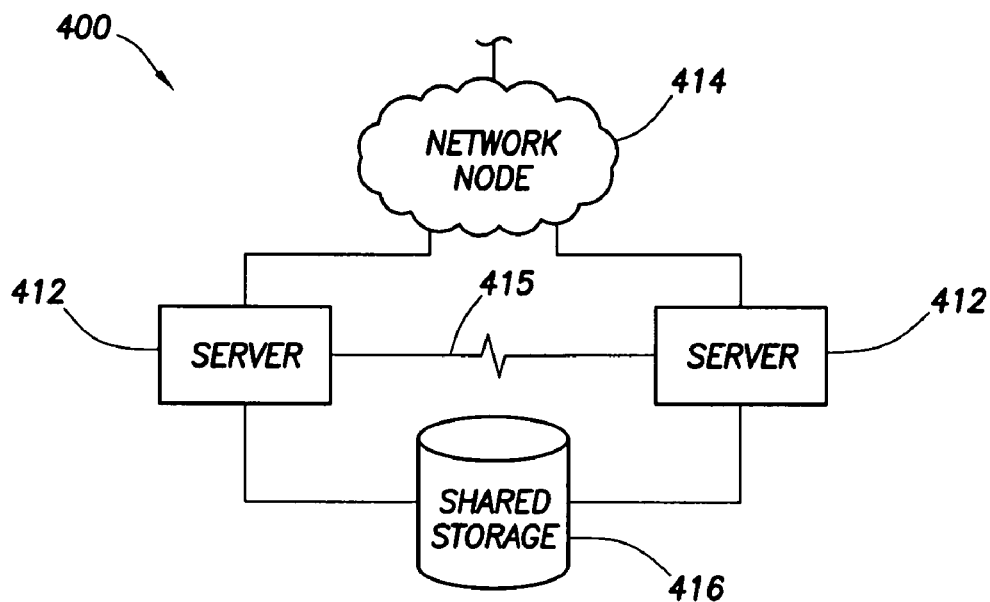
FIG. 4 schematically illustrates a block diagram of a server cluster network.

Shown in FIG. 4 is an exemplary embodiment of a two-node server cluster network 400. The server cluster network 400 may include one or more server nodes 412 that may be interconnected to one another by a heartbeat or communications link 415. Each of the server nodes 412 may be coupled to a network node 414, which represents a connection to a communications network served by the server nodes 412. Each of the server nodes 412 may be coupled to a shared storage unit 416.

Figure 5:
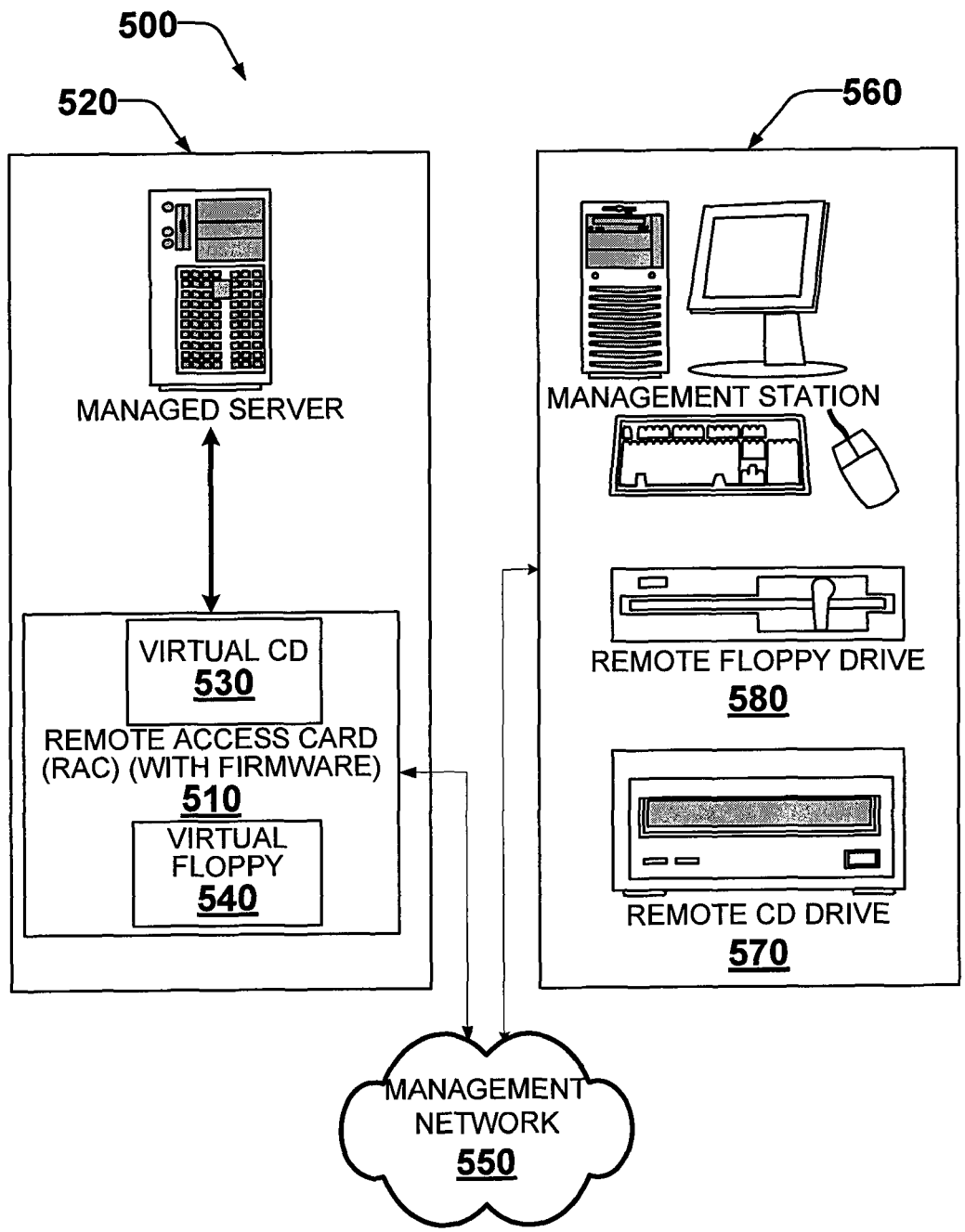
FIG. 5 schematically illustrates an example of the overall architecture and operation of the virtual media feature of a remote access card (RAC) useful in various exemplary embodiments, according to teachings of the present disclosure.

FIG. 5 schematically illustrates an example of the overall architecture 500 and operation of the virtual media feature of a remote access card (RAC) 510, such as a Dell® Remote Access Controller 4 (DRAC4) 510 and/or a Dell® Remote Access Controller 5 (DRAC5) 510. To manage an information handling system, such as a server cluster, remotely, administrators often require a way to remotely copy files to and from the information handling system, such as the server cluster, install applications such as Dell OpenManage® systems management software, and/or install new operating systems, and the like. Such tasks may be performed readily using the virtual media feature in the Dell® Remote Access Controller 4 (DRAC4) 510 and/or the Dell® Remote Access Controller 5 (DRAC5) 510.

The Dell® Remote Access Controller 4 (DRAC4) 510 is an independent, out-of-band management card. The Dell® Remote Access Controller 4 (DRAC4) 510 has its own microprocessor with an embedded operating system (OS), network interface card (NIC), Web server, Telnet interface, and serial interface. The out-of-band mode of communication may allow communication with the Dell® Remote Access Controller 4 (DRAC4) card 510 and/or a managed host server system 520, in which the Dell® Remote Access Controller 4 (DRAC4) card 510 is disposed and/or installed, through the Dell® Remote Access Controller 4 (DRAC4) 510 card's remote access ports, ethernet (a network interface card or NIC embedded in the DRAC4 card 510), modem (optional), and/or VT100 serial interface (optional). The Dell® Remote Access Controller 4 (DRAC4) 510 in the managed host server system 520 runs on auxiliary power and is available even when the managed host server system is powered down. Major features in the Dell® Remote Access Controller 4 (DRAC4) 510 include virtual media, console redirection, power management, alerts, system event logs, and the Microsoft® Active Directory® directory service.

The virtual media feature in the Dell® Remote Access Controller 4 (DRAC4) 510 provides the managed host server system 520 with a virtual CD drive 530 and/or a virtual floppy disk drive 540, for example, that may use standard media connected anywhere on a network 550 in which the managed host server system 520 may be disposed. The virtual CD drive 530 and the virtual floppy disk drive 540 are two electronic devices embedded in the Dell® Remote Access Controller 4 (DRAC4) 510 and controlled by firmware of the Dell® Remote Access Controller 4 (DRAC4) 510. To the operating system (OS) and/or basic input/output system (BIOS) on the managed host server system 520, the virtual CD drive 530 and the virtual floppy disk drive 540 look like a physical CD drive 570 and a physical floppy disk drive 580.

As described above, FIG. 5 schematically illustrates an example of the overall architecture 500 and operation of the virtual media feature of the remote access card (RAC) 510, such as the Dell® Remote Access Controller 4 (DRAC4) 510 and/or the Dell® Remote Access Controller 5 (DRAC5) 510. A management station 560 provides the physical media, such as the remote physical CD drive 570 and/or the remote physical floppy disk drive 580, and/or an image file across the management network 550. For the virtual media feature to work, a virtual media plug-in should be installed in the management station 560. When a remote administrator connects to the remote access card (RAC) 510, such as the Dell® Remote Access Controller 4 (DRAC4) 510 and/or the Dell® Remote Access Controller 5 (DRAC5) 510, through a Web browser and opens the virtual media page for the first time, or when a new version of the plug-in is available in the firmware of the remote access card (RAC) 510, such as the Dell® Remote Access Controller 4 (DRAC4) 510 and/or the Dell® Remote Access Controller 5 (DRAC5) 510, the virtual media plug-in may be downloaded and installed on the management station 560.

Figure 6:
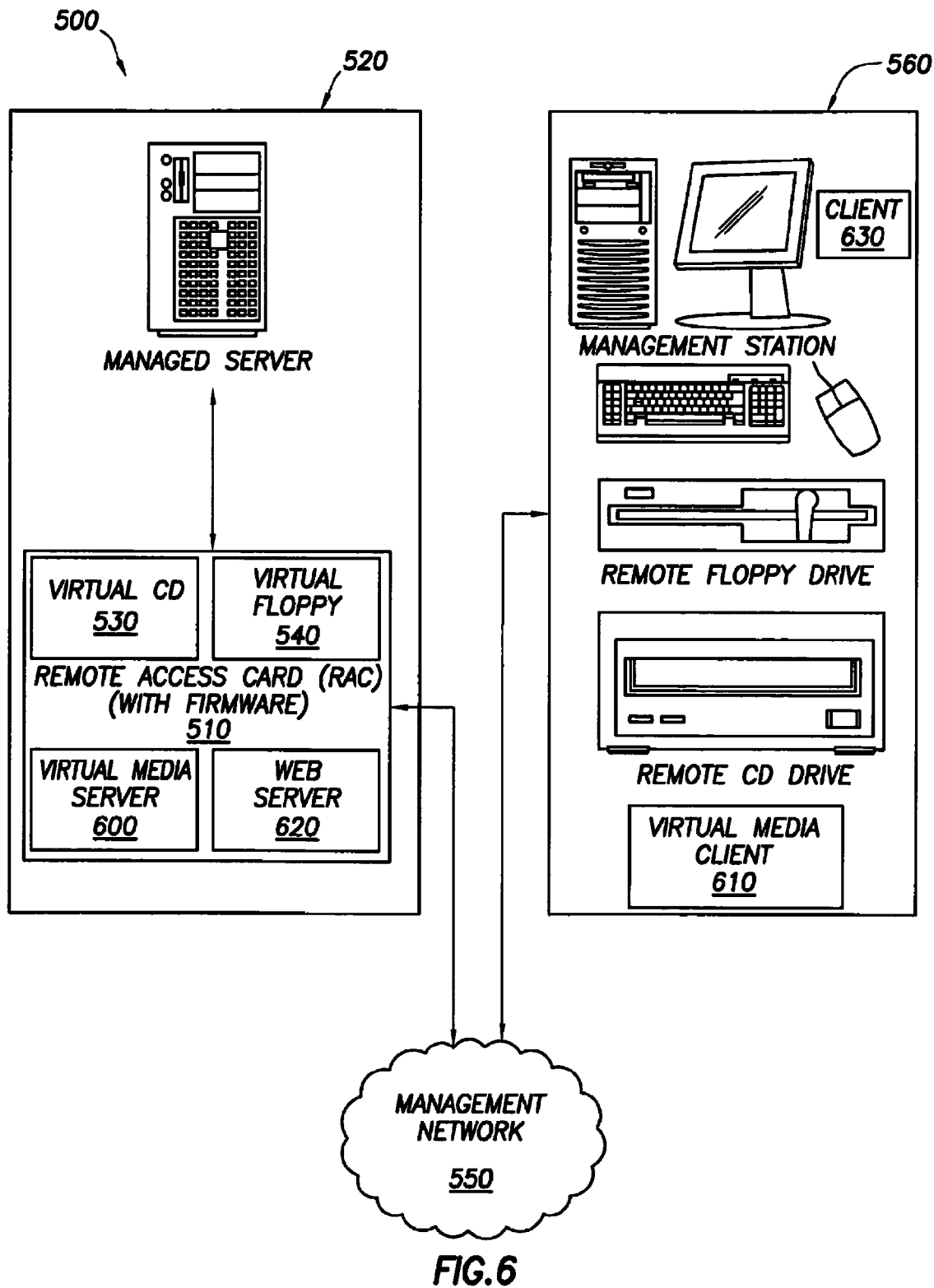
FIG. 6 schematically illustrates a virtual media server that may run in the firmware of the remote access card (RAC), as shown in FIG. 5, and a virtual media client in the plug-in that may run on the management station, according to teachings of the present disclosure.

The remote access card (RAC) 510, such as the Dell® Remote Access Controller 4 (DRAC4) 510 and/or the Dell® Remote Access Controller 5 (DRAC5) 510, may use a client/server model to perform virtual media functions. As shown in FIG. 6, for example, a virtual media server 600 may run in the firmware of the remote access card (RAC) 510, such as the Dell® Remote Access Controller 4 (DRAC4) 510 and/or the Dell® Remote Access Controller 5 (DRAC5) 510, and a virtual media client 610 in the plug-in may run on the management station 560. Once logged in to a Web server 620 of the remote access card (RAC) 510, such as the Dell® Remote Access Controller 4 (DRAC4) 510 and/or the Dell® Remote Access Controller 5 (DRAC5) 510, by using a client 630 disposed in the management station 560, for example, administrators may open the Virtual Media page to launch a connection to the virtual media server 600. When a virtual media session is established, all virtual CD 530 and/or virtual floppy disk drive 540 access requests from the managed host server system 520 may be directed to the virtual media plug-in on the management station 560 through the management network 550. The plug-in processes the requests, accesses the local device that is used as the virtual CD media and/or the virtual floppy disk drive media, such as the remote physical CD drive 570 and/or the remote physical floppy disk drive 580, and sends a response back to the virtual media server 600. The virtual media server 600 then sends the response to the virtual CD 530 device and/or the virtual floppy disk drive 540 device embedded in the remote access card (RAC) 510, such as the Dell® Remote Access Controller 4 (DRAC4) 510 and/or the Dell® Remote Access Controller 5 (DRAC5) 510.

If the virtual media is not connected by a remote administrator, then the firmware for the remote access card (RAC) 510, such as the Dell® Remote Access Controller 4 (DRAC4) 510 and/or the Dell® Remote Access Controller 5 (DRAC5) 510, automatically responds to any media access command with a "media not present" error message to the virtual CD 530 device and/or the virtual floppy disk drive 540 device. In such a scenario, the virtual CD 530 device and/or the virtual floppy disk drive 540 device behaves substantially the same way as the remote physical CD drive 570 and/or the remote physical floppy disk drive 580 device does that also does not have any media present. The virtual media devices, such as the virtual CD 530 and/or the virtual floppy disk drive 540, are always present to the operating system (OS) and/or basic input/output system (BIOS) on the managed host server system 520, regardless of whether or not the virtual media is connected.

Consequently, because the virtual CD 530 device and/or the virtual floppy disk drive 540 device looks substantially exactly like the remote physical CD drive 570 and/or the remote physical floppy disk drive 580 device in either connected or unconnected mode, the operating system (OS) on the managed host server system 520 may use a standard native device driver to access the virtual CD 530 device and/or the virtual floppy disk drive 540 device. Before the operating system (OS) loads its device driver, an integrated device electronics (IDE) option read only memory (ROM) basic input/output system (BIOS) embedded on the remote access card (RAC) 510, such as the Dell® Remote Access Controller 4 (DRAC4) 510, may take control of the virtual CD 530 device and/or the virtual floppy disk drive 540 device.

The system basic input/output system (BIOS) may detect the virtual CD 530 device and/or the virtual floppy disk drive 540 device during the power-on self-test (POST) and may report the virtual CD 530 device and/or the virtual floppy disk drive 540 device as one or more boot entry vector (BEV) devices. The managed host server system 520 basic input/output system (BIOS) may add these boot entry vector (BEV) devices in the boot order list of the managed host server system 520 basic input/output system (BIOS). Administrators may change the boot order list of the managed host server system 520 basic input/output system (BIOS) in the basic input/output system (BIOS) setup screen to boot from the virtual CD 530 device and/or the virtual floppy disk drive 540 device.

Administrators may also readily use the virtual media feature to install a new operating system (OS) and/or driver, and/or to diagnose a system in a pre-operating system (pre-OS) environment. When used with console redirection, for example, the virtual media feature may further enable administrators to achieve very good remote-access capability.

Figure 7:
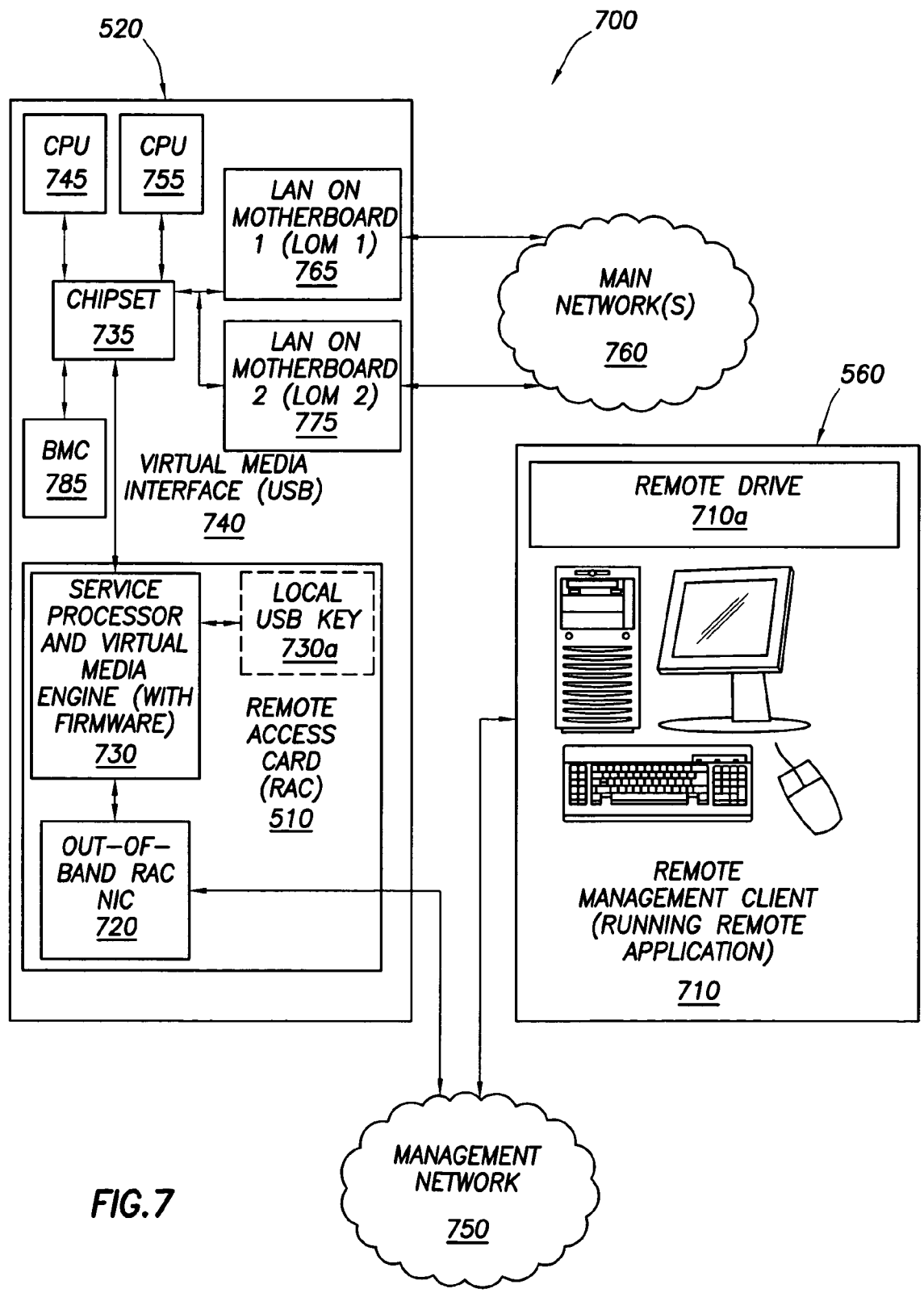
FIG. 7 schematically illustrates a diagram of a system 700 in which a method for characterizing server utilization out-of-band via remote access card virtual media may be used in various exemplary embodiments, according to teachings of the present disclosure.

FIG. 7 schematically illustrates a diagram of a system 700 in which a method for characterizing server utilization out-of-band via remote access card virtual media may be used in various exemplary embodiments, according to teachings of the present disclosure. In various illustrative embodiments, the system 700 may include the managed host server system 520 and a remote access solution comprising the remote access card (RAC) 510, such as the Dell® Remote Access Controller 4 (DRAC4) 510 and/or the Dell® Remote Access Controller 5 (DRAC5) 510, disposed in the managed host server system 520. The remote access card (RAC) 510 may comprise an out-of-band dedicated remote access card (RAC) network interface card (NIC) 720 and a service processor and a virtual media engine 730. The out-of-band dedicated remote access card (RAC) network interface card (NIC) 720 may allow remote access to remote access card (RAC) 510 by a remote management client 710 through a management network 750 via at least one remote access card administrative command (RACADM) through the out-of-band dedicated remote access card (RAC) network interface card (NIC) 720 disposed in the remote access card (RAC) 510 and communicatively coupled with the service processor and the virtual media engine 730.

The service processor and the virtual media engine 730 may be communicatively coupled with a chipset 735 disposed in the managed host server system 520 through a universal serial bus (USB) virtual media interface 740. The chipset 735 may be communicatively coupled with one or more central processing units (CPUs), such as central processing units (CPUs) 745 and 755 disposed in the managed host server system 520. The chipset 735 may also be communicatively coupled with one or more local area networks (LANs) on motherboards (LOMs), such as local area network (LAN) on motherboard 1 (LOM 1) 765 and local area network (LAN) on motherboard 2 (LOM 2) 775 disposed in the managed host server system 520. The local area network (LAN) on motherboard 1 (LOM 1) 765 and the local area network (LAN) on motherboard 2 (LOM 2) 775 may be communicatively coupled with one or more main network(s) 760. The chipset 735 may also be communicatively coupled with a baseboard management controller 785.

The service processor and the virtual media engine 730 of the remote access card (RAC) 510 may have firmware capable of connecting a plug-and-play virtual drive, having an auto-run data gathering executable, to the managed host server system 520 at a preselected and/or selected polling interval via a plug-and-play universal serial bus (USB) virtual media interface 740 between the remote access card (RAC) 510 and the managed host server system 520, the plug-and-play virtual drive emulating at least one of a remote drive 710a disposed in a remote management client 710 and a local virtual key 730a (shown in phantom) disposed in the remote access card (RAC) 510. The firmware of the service processor and the virtual media engine 730 of the remote access card (RAC) 510 may also be capable of collecting at least one preselected and/or selected desired parameter from the managed host server system 520 at the preselected and/or selected polling interval, using the auto-run data gathering executable that writes at least one result of the collection of the at least one preselected and/or selected desired parameter to (1) the remote drive 710a disposed in the remote management client 710 through the out-of-band dedicated remote access card (RAC) network interface card (NIC) 720 and the management network 750 and/or (2) the local virtual key disposed in the remote access card (RAC) 510. Note that the firmware of the service processor and the virtual media engine 730 is necessarily firmware of the remote access card (RAC) 510, since the service processor and the virtual media engine 730 is disposed in the remote access card (RAC) 510.

Figure 8:
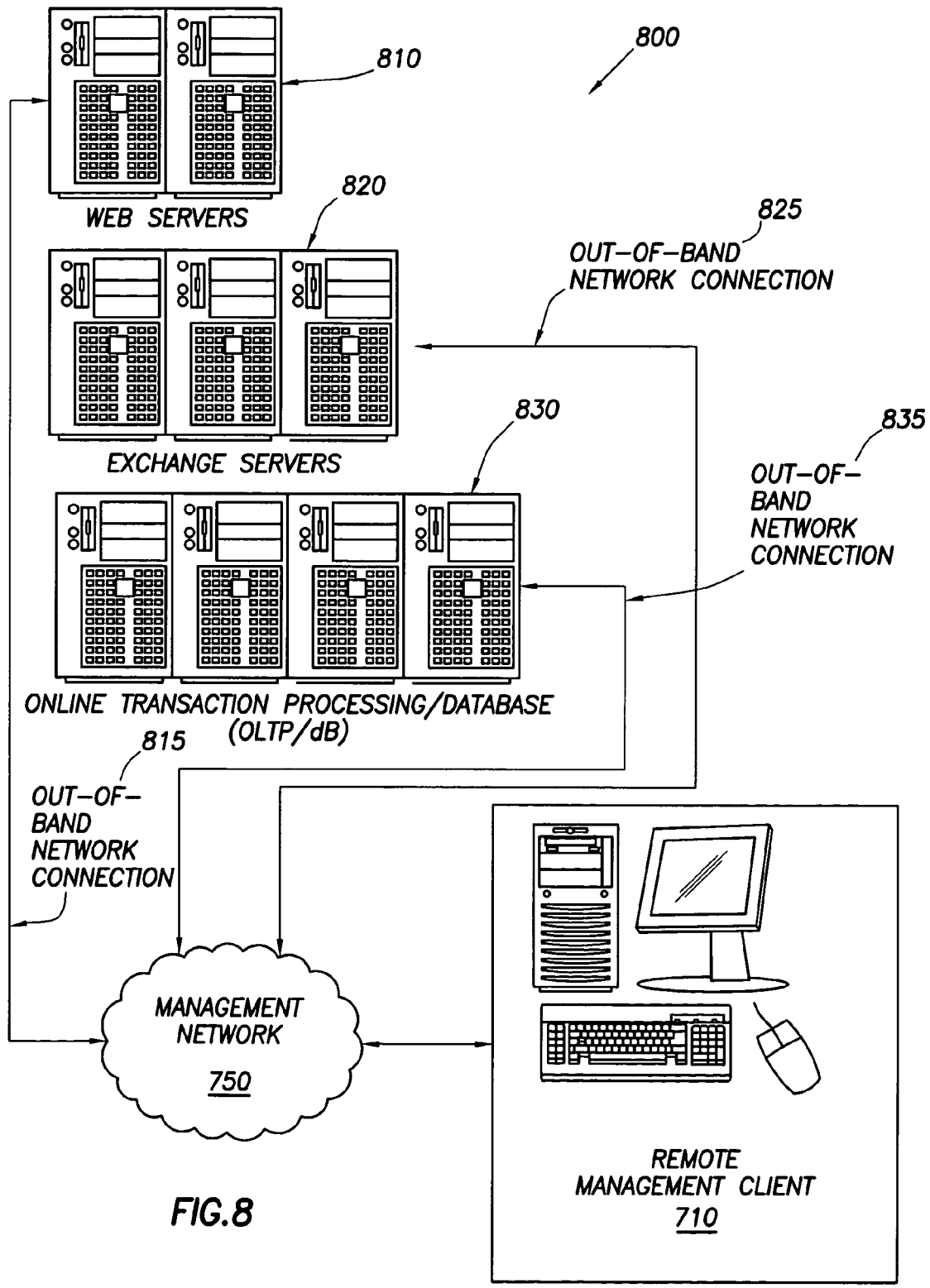
FIG. 8 schematically illustrates an example of a configuration of active servers communicatively coupled with a remote management client through a management network in which a method for characterizing server utilization out-of-band via remote access card virtual media may be used in various exemplary embodiments, according to teachings of the present disclosure.

FIG. 8 schematically illustrates an example of a configuration 800 of active servers communicatively coupled with the remote management client 710 through the management network 750 in which various exemplary embodiments of methods for characterizing server utilization out-of-band via remote access card virtual media may be used, as described in more detail below, according to teachings of the present disclosure. In various illustrative embodiments, the configuration 800 may include one or more web servers 810 communicatively coupled with the remote management client 710 through an out-of-band network connection 815 through the management network 750, one or more exchange servers 820 communicatively coupled with the remote management client 710 through an out-of-band network connection 825 through the management network 750, and/or one or more servers that are included in an online transaction processing (OLTP)/Database (OLTP/dB) 830 communicatively coupled with the remote management client 710 through an out-of-band network connection 835 through the management network 750, for example.

In various illustrative embodiments, a performance snapshot text file of at least one result of the collection of the at least one preselected and/or selected desired parameter may be written to (1) the remote drive 710a disposed in the remote management client 710 through the out-of-band dedicated remote access card (RAC) network interface card (NIC) 720 and the management network 750 and/or (2) the local virtual key 730a disposed in the remote access card (RAC) 510, using a remote application running in the remote management client 710. The remote application may copy and parse the performance snapshot text file for at least one relevant field and may populate a spreadsheet and/or a database for plotting purposes and/or analysis purposes. In various illustrative embodiments, at least one trend from the spreadsheet and/or the database may be analyzed to predict when at least one preselected and/or selected managed host server system 520, such as one or more of the web servers 810, the exchange servers 820, and/or the servers that are included in the online transaction processing (OLTP)/Database (OLTP/dB) 830, should be scaled, to predict at least one impact of at least one upgrade before purchase, to do a cost/benefit analysis, and/or to link to a vendor for at least one sales recommendation.

Figure 9:
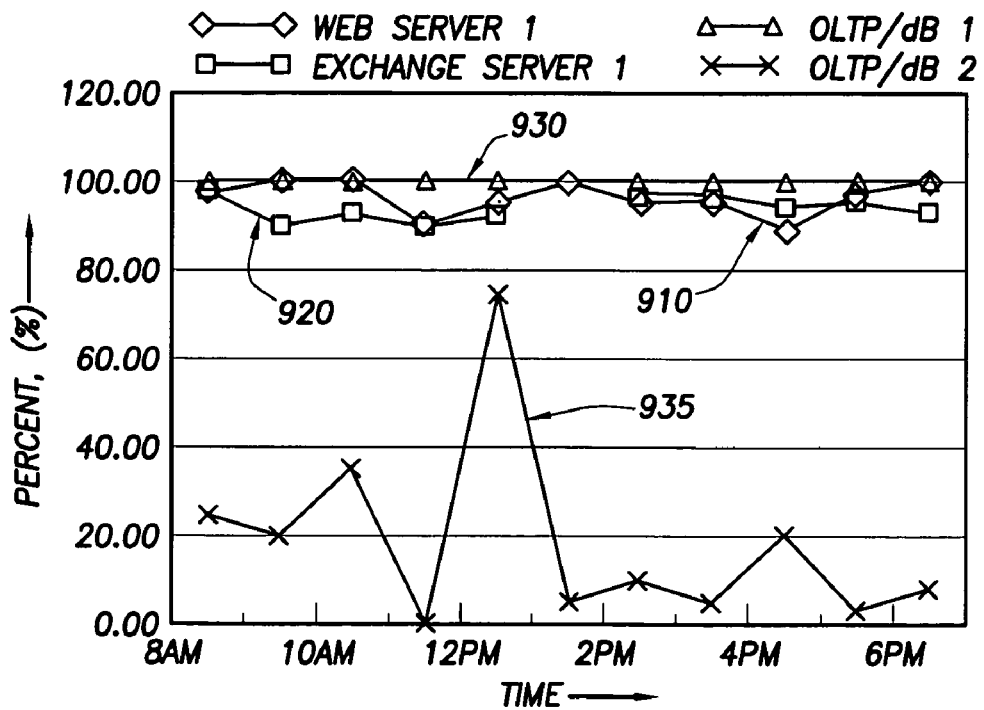
FIG. 9 schematically illustrates an example of a chart characterizing server utilization using the out-of-band via remote access card virtual media for the configuration of active servers communicatively coupled with the remote management client through the management network shown in FIG. 8.

FIG. 9 schematically illustrates an example of a chart 900 characterizing server percent (%) utilization plotted against time, for a preselected and/or selected parameter X, using the out-of-band via remote access card virtual media useful for plotting purposes and/or analysis purposes for one or more of the servers of the configuration 800 of active servers shown in FIG. 8. For example, in various illustrative embodiments, the preselected and/or selected parameter X may include one or more of a performance parameter and/or a process parameter. In various particular illustrative embodiments, the preselected and/or selected parameter X may include one or more of a central processing unit (CPU) utilization parameter, a memory utilization parameter, a disk utilization parameter, and/or a process monitoring parameter, and the like, for example. The chart 900 plots server percent (%) utilization against time, for the preselected and/or selected parameter X for web server 1, one of the web servers 810, as indicated at 910, for exchange server 1, one of the exchange servers 820, as indicated at 920, and for OLTP/dB 1 and OLTP/dB 2, two of the servers that are included in the online transaction processing (OLTP)/Database (OLTP/dB) 830, as indicated at 930 and 935, respectively, for example.

Figure 10:
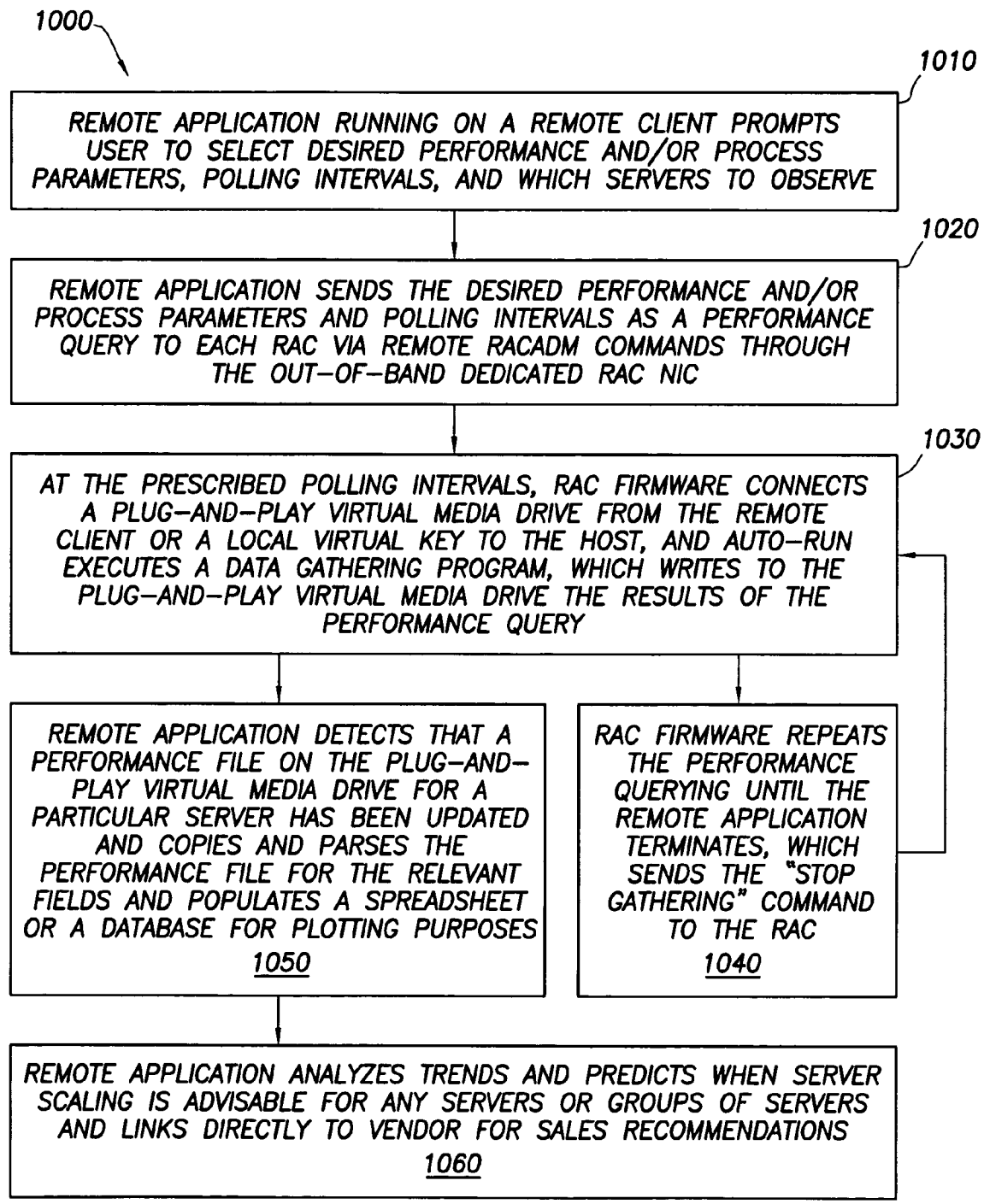
FIG. 10 schematically illustrates an example of a flowchart for a method for characterizing server utilization out-of-band via remote access card virtual media may be used in various exemplary embodiments, according to teachings of the present disclosure.

FIG. 10 schematically illustrates an example of a flowchart 1000 useful in various exemplary embodiments of methods for characterizing server utilization out-of-band via remote access card virtual media, as described in more detail below, according to teachings of the present disclosure. In various illustrative embodiments, the remote application running on the remote management client 710 may prompt a user and/or a customer to select one or more desired performance and/or process parameters, polling intervals, and which managed host server systems 520 to observe, as indicated at 1010. The remote application may send the desired performance and/or process parameters and polling intervals as a performance query to each remote access card (RAC) 510 disposed in each of the selected managed host server systems 520 via one or more remote RACADM commands through the out-of-band dedicated RAC NIC 720, as indicated at 1020. At the prescribed polling intervals, the remote access card (RAC) 510 firmware may connect a plug-and-play virtual media drive from the remote management client 710 or the local virtual key 730a to the managed host server system 520, and may auto-run execute a data gathering program, which writes to the plug-and-play virtual media drive the results of the performance query, as indicated at 1030.

The remote access card (RAC) 510 firmware may repeat the performance querying until the remote application terminates, which sends the "stop gathering" command to the remote access card (RAC) 510, as indicated at 1040. The remote application may detect that a performance file on the plug-and-play virtual media drive for a particular managed host server system 520 has been updated and may copy and parse the performance file for the relevant fields and populate the spreadsheet and/or the database for plotting purposes, as indicated at 1050. The remote application may analyze trends and predict when server scaling is advisable for any managed host server system(s) 520 or groups of managed host server system(s) 520 and link directly to a vendor for sales recommendations, as indicated at 1060.

Figure 11:
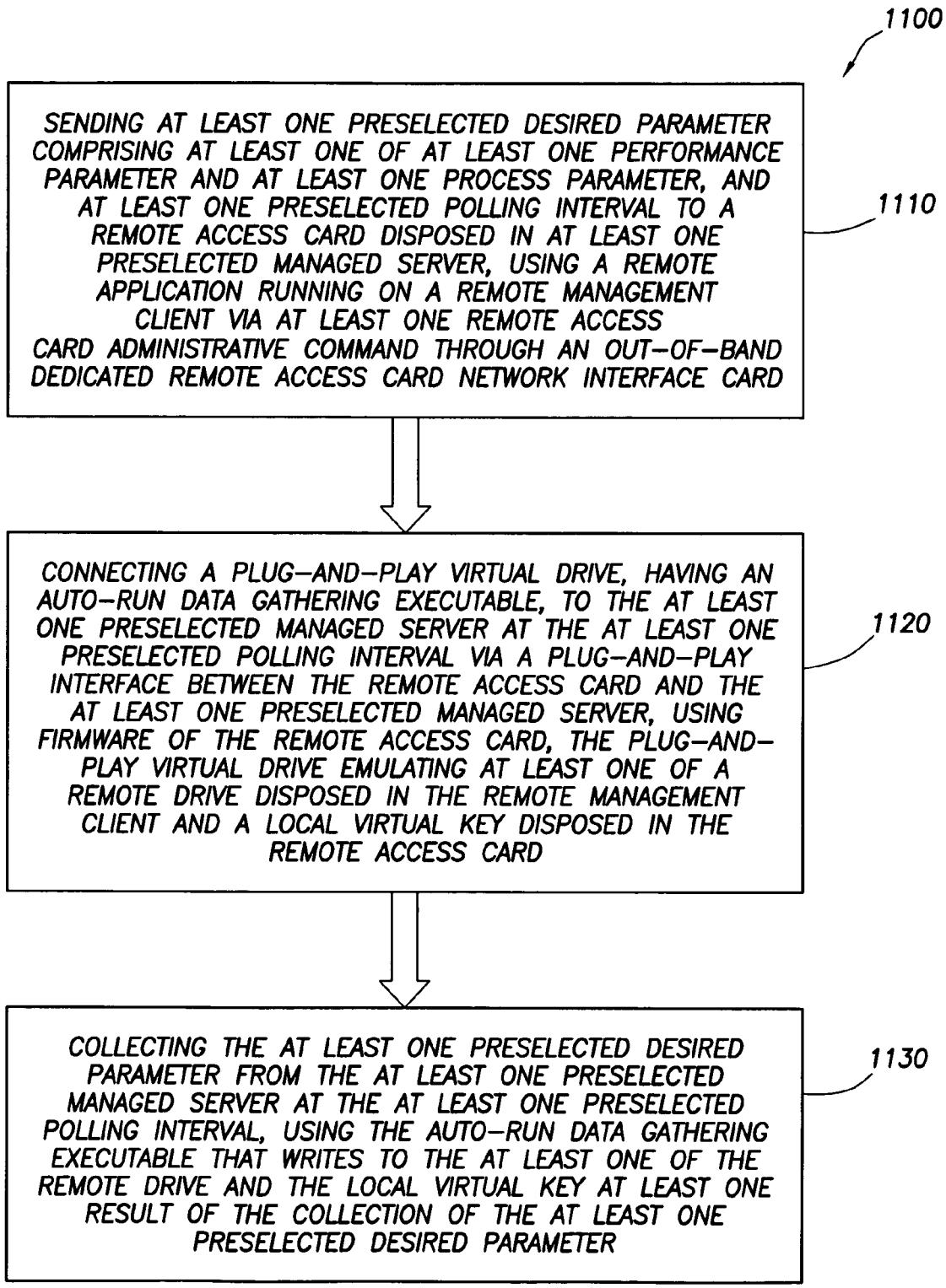
FIG. 11 schematically illustrates an exemplary method for characterizing server utilization out-of-band via remote access card virtual media, according to teachings of the present disclosure.

FIG. 11 schematically illustrates various exemplary embodiments of methods for characterizing server utilization out-of-band via remote access card virtual media, according to teachings of the present disclosure. In various illustrative embodiments, as shown in FIG. 11, a method 1100 for characterizing server utilization out-of-band via remote access card virtual media may be provided. The method 1100 may comprise sending at least one preselected and/or selected desired parameter comprising at least one performance parameter and/or at least one process parameter, and at least one preselected and/or selected polling interval to the remote access card (RAC) 510 disposed in at least one preselected and/or selected managed host server system 520, using a remote application running on the remote management client 710 via at least one remote access card administrative command (RACADM) through an out-of-band dedicated remote access card (RAC) network interface card (NIC) 720, as indicated at 1110.

In various illustrative embodiments, the method 1100 may further comprise prompting a user to preselect and/or select the at least one preselected and/or selected desired parameter comprising the at least one performance parameter and/or the at least one process parameter, the at least one preselected and/or selected polling interval, and the at least one preselected and/or selected managed host server system 520 to observe, using the remote application running on the remote management client 710. In various illustrative embodiments, the method 1100 may further comprise sending the at least one preselected and/or selected desired parameter comprising a central processing unit utilization parameter, a memory utilization parameter, a disk utilization parameter, and/or a process monitoring parameter, and the like, to the remote access card (RAC) 510 disposed in the at least one preselected and/or selected managed host server system 520.

The method 1100 may also comprise connecting a plug-and-play virtual drive, having an auto-run data gathering executable, to the at least one preselected and/or selected managed host server system 520 at the at least one preselected and/or selected polling interval via the plug-and-play virtual media interface 740 between the remote access card (RAC) 510 and the at least one preselected and/or selected managed host server system 520, using the firmware of the service processor and the virtual media engine 730 of the remote access card (RAC) 510, the plug-and-play virtual drive emulating the remote drive 710a disposed in the remote management client 710 and/or the local virtual key 730a disposed in the remote access card (RAC) 510, as indicated at 1120. In various illustrative embodiments, the method 1100 may further comprise gathering further out-of-band data by querying the baseboard management controller 785 disposed in the at least one preselected and/or selected managed host server system 520 for at least one status signal comprising central processor unit (CPU) throttling and/or memory throttling.

The method 1100 may also comprise collecting the at least one preselected and/or selected desired parameter from the at least one preselected and/or selected managed host server system 520 at the at least one preselected and/or selected polling interval, using the auto-run data gathering executable that writes to the remote drive 710a and/or the local virtual key 730a at least one result of the collection of the at least one preselected and/or selected desired parameter, as indicated at 1130. In various illustrative embodiments, the method 1100 may further comprise collecting the at least one preselected and/or selected desired parameter from the at least one preselected and/or selected managed host server system 520 at the at least one preselected and/or selected polling interval, using the auto-run data gathering executable that writes the performance snapshot text file to the remote drive 710a and/or the local virtual key 730a, the performance snapshot text file comprising at least one result of the collection of the at least one preselected and/or selected desired parameter.

In various illustrative embodiments, the method 1100 may further comprise detecting the at least one result of the collection of the at least one preselected and/or selected desired parameter written to the at least one of the remote drive 710a and the local virtual key 730a, using the remote application running in the remote management client 710. In various illustrative embodiments, the method 1100 may further comprise detecting the performance snapshot text file of the at least one result of the collection of the at least one preselected and/or selected desired parameter written to the remote drive 710a and/or the local virtual key 730a, using the remote application that copies and parses the performance snapshot text file of the at least one result of the collection of the at least one preselected and/or selected desired parameter for at least one relevant field and populates the spreadsheet and/or the database for at least one of plotting purposes and analysis purposes.

In various illustrative embodiments, the method 1100 may further comprise detecting the at least one result of the collection of the at least one preselected and/or selected desired parameter written to the at least one of the remote drive 710a and the local virtual key 730a, using the remote application running in the remote management client 710, the remote application copying and parsing the at least one result of the collection of the at least one preselected and/or selected desired parameter for at least one relevant field and populating the spreadsheet and/or the database for plotting purposes and/or analysis purposes. In these various illustrative embodiments, the method 1100 may further comprise analyzing at least one trend from the spreadsheet and/or the database to predict when the at least one preselected and/or selected managed host server system 520 should be scaled. In these various illustrative embodiments, the method 1100 may further comprise analyzing at least one trend from the spreadsheet and/or the database to predict when the at least one preselected and/or selected managed host server system 520 should be scaled, to predict at least one impact of at least one upgrade before purchase, to do a cost/benefit analysis, and/or to link to a vendor for at least one sales recommendation.

In various illustrative embodiments, the method 1100 may further comprise repeating the collection of the at least one preselected and/or selected desired parameter from the at least one preselected and/or selected managed host server system 520 at the at least one preselected and/or selected polling interval, using the auto-run data gathering executable, using the firmware of the service processor and the virtual media engine 730 of the remote access card (RAC) 510 until the remote application running on the remote management client 710 sends at least one remote access card administrative command (RACADM) to stop collecting the at least one preselected and/or selected desired parameter from the at least one preselected and/or selected managed host server system 520. In various illustrative embodiments, the method 1100 may further comprise terminating the auto-run data gathering executable and disconnecting the plug-and-play virtual drive that has the auto-run data gathering executable from the at least one preselected and/or selected managed host server system 520 via the plug-and-play virtual media interface 740 between the remote access card (RAC) 510 and the at least one preselected and/or selected managed host server system 520, using the firmware of the service processor and the virtual media engine 730 of the remote access card (RAC) 510.

In various illustrative embodiments, the method 1100 may further comprise terminating the auto-run data gathering executable and disconnecting the plug-and-play virtual drive that has the auto-run data gathering executable from the at least one preselected and/or selected managed host server system 520 via the plug-and-play virtual media interface 740 between the remote access card (RAC) 510 and the at least one preselected and/or selected managed host server system 520, using the firmware of the service processor and the virtual media engine 730 of the remote access card (RAC) 510. In these various illustrative embodiments, the method 1100 may further comprise replacing the auto-run data gathering executable dynamically, based on at least one performance result, to tweak at least one performance parameter on the at least one preselected and/or selected managed host server system 520 via the plug-and-play virtual media interface 740 between the remote access card (RAC) 510 and the at least one preselected and/or selected managed host server system 520 to substantially optimize performance of the at least one preselected and/or selected managed host server system 520 on-the-fly and/or kill off at least one process in the at least one preselected and/or selected managed host server system 520 that substantially inhibits in-band network access, using the firmware of the service processor and the virtual media engine 730 of the remote access card (RAC) 510.

In various illustrative embodiments, as described above, the method for characterizing server utilization out-of-band via remote access card virtual media disclosed herein is advantageous in providing insight to customers and/or users of servers, who understand the advantages of using scalable enterprise servers, about how their server computing power and/or capacity are being utilized and also when and where scaling may need to occur within their infrastructure. The method for characterizing server utilization out-of-band via remote access card virtual media disclosed herein is further advantageous in providing insight to customers and/or users of servers into how well each of their servers are being utilized and enabling customers and/or users of servers easily to identify and/or foresee bottlenecks in order to scale their hardware investments more effectively. The method for characterizing server utilization out-of-band via remote access card virtual media disclosed herein is also advantageous to customers and/or users of servers by not interfering with the main functions and/or network utilization of their servers. In addition, the method for characterizing server utilization out-of-band via remote access card virtual media disclosed herein is advantageous in allowing profiling of active and/or runaway processes and/or idle systems and in causing alerts that may help administrators proactively to address issues and/or optimize the computing power of their servers.

Moreover, the method for characterizing server utilization out-of-band via remote access card virtual media disclosed herein is advantageous in allowing profiling of system utilization via out-of-band server management functionality so that, consequently, performance characterization of clustered servers does not use and/or does not interrupt the in-band network resources. This ability to profile system utilization via out-of-band server management functionality is useful for administrators who manage numerous servers and want an automated mechanism for knowing the utilization of each one over time. This aids in better function and/or load balancing to optimize the overall infrastructure's utilization as well as understanding better when new servers and/or upgrades would be needed to relieve recurring bottlenecks. Unlike existing conventional off-the-shelf performance monitor applications, which all operate through in-band network interfaces and involve processes always running on the host server, the method for characterizing server utilization out-of-band via remote access card virtual media disclosed herein is further advantageous in operating through out-of-band network interfaces and/or involving processes that do not always run of the managed host server system. Furthermore, the method for characterizing server utilization out-of-band via remote access card virtual media disclosed herein is advantageous in helping small and medium businesses scale their enterprise server infrastructure via out-of-band, real-time, and extended performance analyses that link back to a vendor, such as Dell Sales, and to recommended server upgrade path.

For example, by collecting and processing performance data through an automated firmware routine of a remote access card (RAC) 510, such as the Dell® Remote Access Controller 4 (DRAC4) 510 and/or the Dell® Remote Access Controller 5 (DRAC5) 510, and the like, and a remote application through the DRAC's network and virtual media interfaces, such as the remote access card (RAC) 510 network interface card (NIC) 720 and the universal serial bus (USB) virtual media interface 740, the in-band main network 760 bandwidth is not affected while the remote application running on the remote management client 710 gathers performance and/or active process snapshots from each of the managed server systems 520 at configurable polling intervals. Runaway processes, such as viruses, and/or idle systems, such as lockups, may also be determined and alerts may be issued by the method for characterizing server utilization out-of-band via remote access card virtual media disclosed herein for proactive attention to issues that may be hard to detect through other means.

In various illustrative embodiments, as described above, the method for characterizing server utilization out-of-band via remote access card virtual media disclosed herein is advantageous in providing the capability for a sequence of dynamical virtual media attach, auto-run, and gather to a virtual drive, a remote drive, and/or a local key, detach for performance data gathering, and/or execution of one or more performance altering commands. In various illustrative embodiments, as described above, the method for characterizing server utilization out-of-band via remote access card virtual media disclosed herein is advantageous in providing the capability for customized performance analysis that may recommend specific hardware enhancements and/or scaling, including the capability for auto-scaling. In various illustrative embodiments, as described above, the method for characterizing server utilization out-of-band via remote access card virtual media disclosed herein is advantageous in providing the capability for performance enhancement recommendations that link to relevant vendor sites, such as Dell Sales sites.

In various illustrative embodiments, as described above, the DRAC, such as the Dell® Remote Access Controller 4 (DRAC4) 510 and/or the Dell® Remote Access Controller 5 (DRAC5) 510, and the like, may provide a virtual media feature that allows remote client drives, such as the remote client drive 710a, and/or media, such as the local virtual key 730a, to be emulated to the managed host server system 520 as if the remote client drives and/or media were local via a plug-and-play interface, such as a universal serial bus (USB), like the universal serial bus (USB) virtual media interface 740, for example. The DRAC, such as the Dell® Remote Access Controller 4 (DRAC4) 510 and/or the Dell® Remote Access Controller 5 (DRAC5) 510, and the like, may control the presence of devices such as the remote client drives and/or media to the managed host server system 520 via the plug-and-play interface, such as the universal serial bus (USB) virtual media interface 740, for example, for remote customer control, such as by the remote management client 710 through a management network 750.

With respect to out-of-band performance gathering and/or managed host server system tweaks, in various illustrative embodiments, as described above, the firmware of the service processor and the virtual media engine 730 of the remote access card (RAC) 510 may periodically induce data collection from the managed host server system 520 via attaching a plug-and-play virtual drive having an auto-run data collection executable. The auto-run data collection executable may gather either specific and/or a wide variety of performance data from the managed host server system 520, such as a central processing unit (CPU) utilization parameter, a memory utilization parameter, a disk utilization parameter, and/or a process monitoring parameter, and the like, in the form of a performance snapshot text file that is written back to the remote drive 710a across the out-of-band dedicated remote access card (RAC) network interface card (NIC) 720. In addition to the auto-run data collection executable gathering out-of-band performance data from one or more of the CPUs 745 and/or 755 of the managed host server system 520, further out-of-band performance data may be gathered via querying the baseboard management controller 785 disposed in the managed host server system 520 for various status signals such as central processor unit (CPU) throttling and/or memory throttling to help gauge over time which of the managed host server systems 520 may be throttling down their performance due to thermal and/or other reasons.

In various illustrative embodiments, as described above, the auto-run data collection executable may terminate and the firmware of the service processor and the virtual media engine 730 of the remote access card (RAC) 510 may disconnect the plug-and-play virtual drive from the managed host server system 520. Through such a mechanism, the firmware of the service processor and the virtual media engine 730 of the remote access card (RAC) 510 may periodically execute commands on and/or tweak the managed host server system 520 through the attach/auto-run/de-attach sequence of the plug-and-play virtual drive to/on/from the managed host server system 520.

With respect to client side data processing, in various illustrative embodiments, as described above, the remote application, such as a performance profiling application, running on the remote management client 710, may then have the updated performance snapshot text file present on the remote drive 710a. The remote application, such as the performance profiling application, may copy and parse the new performance snapshot text file into a spreadsheet and/or a database type application under the respective name of the managed host server system 520.

The remote application, such as the performance profiling application, may substantially simultaneously perform this copying and parsing action for any number of managed host server systems 520 and may allow an administrator to see over time when and where peaks and/or lulls in utilization and/or other parameters occur, such as when active processes occur, across the arrays of managed host server systems 520 being observed. The user and/or customer may choose what parameters to plot for any number of managed host server systems 520 at substantially any instant and/or over time, thereby aiding administrators and/or other applications in load balancing and/or relieving bottlenecks in any of the managed host server systems 520 and/or arrays of managed host server systems 520. Based on the performance results, the auto-run data collection executable of the plug-and-play virtual drive may be dynamically replaced to execute commands that tweak any number of performance parameters on the managed host server system 520 substantially to optimize performance of the managed host server system 520 on-the-fly and/or kill off processes in the managed host server system 520 that substantially inhibits in-band network access, such as flood attacks.

With respect to predictive upgrades and/or linkage to a vendor, such as Dell, in various illustrative embodiments, as described above, the remote application, such as the performance profiling application, running on the remote management client 710, may further analyze the parameters that are most important to a user and/or customer and may provide alerts and/or foretell utilization trends to predict when upgrades may be useful and/or necessary, extending to commodity server scaling concepts and/or abilities similar to those used in predictive printer ink refilling. The remote application, such as the performance profiling application, may also predict the impacts of certain upgrades before purchase and/or may do a cost/benefit analysis. The remote application, such as the performance profiling application, may then help the user and/or customer in upgrading hardware and/or adding additional server capacity by linking directly to a vendor, such as Dell Sales, for recommended upgrades.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A method for characterizing server utilization out-of-band via remote access card virtual media, the method comprising:
  prompting a user to preselect at least one preselected desired parameter comprising at least one of at least one performance parameter, at least one process parameter, at least one preselected polling interval, and at least one preselected managed host server system to observe, using a remote application running on a remote management client;
  sending the at least one preselected desired parameter comprising at least one of at least one performance parameter, the at least one process parameter, and the at least one preselected polling interval to a remote access card disposed in at least one preselected managed host server system, using the remote application running on the remote management client via at least one remote access card administrative command through an out-of-band dedicated remote access card network interface card;

connecting a plug-and-play virtual drive, having an auto-run data gathering executable, to the at least one preselected managed host server system at the at least one preselected polling interval via a plug-and-play virtual media interface between the remote access card and the at least one preselected managed host server system, using firmware of the remote access card, the plug-and-play virtual drive emulating at least one of a remote drive disposed in the remote management client and a local virtual key disposed in the remote access card;

saving to the remote drive disposed in the remote management client the at least one preselected desired parameter from the at least one preselected managed host server system at the at least one preselected polling interval through a network without completely interrupting the at least one preselected managed host server system, using the auto-run data gathering executable running on the firmware of the remote access card disposed in the at least one preselected managed host server system that writes a performance snapshot text file to the at least one of the remote drive and the local virtual key, wherein the performance snapshot text file comprises at least one result of the collection of the at least one preselected desired parameter;

repeating the saving to the remote drive the at least one preselected desired parameter from the at least one preselected managed host server system at the at least one preselected polling interval, using the auto-run data gathering executable, using firmware of the remote access card until the remote application running on the remote management client sends at least one remote access card administrative command to stop collecting the at least one preselected desired parameter from the at least one preselected managed host server system;

detecting the performance snapshot text file comprising the at least one result of the collection of the at least one preselected desired parameter written to the at least one of the remote drive and the local virtual key, using the remote application;

analyzing at least one trend from the at least one of the spreadsheet and the database to at least one of predict when the at least one preselected managed host server system should be scaled, predict at least one impact of at least one upgrade before purchase, do a cost/benefit analysis, and link to a vendor for at least one sales recommendation; and terminating the auto-run data gathering executable running on the firmware of the remote access card.

2. The method of claim 1, wherein the remote application copies and parses the performance snapshot text file comprising the at least one result of the collection of the at least one preselected desired parameter for at least one relevant field and populates at least one of a spreadsheet and a database for at least one of plotting purposes and analysis purposes.

3. The method of claim 2, wherein analyzing at least one trend includes predicting when the at least one preselected managed host server system should be scaled.

4. The method of claim 1, wherein sending the at least one preselected desired parameter comprising at least one of the at least one performance parameter and the at least one process parameter to the remote access card disposed in the at least one preselected managed host server system further comprises sending the at least one preselected desired parameter comprising at least one of a central processing unit utilization parameter, a memory utilization parameter, a disk utilization parameter, and a process monitoring parameter to the remote access card disposed in the at least one preselected managed host server system.

5. The method of claim 1, wherein collecting the at least one preselected desired parameter from the at least one preselected managed host server system at the at least one preselected polling interval, using the auto-run data gathering executable further comprises gathering further out-of-band data by querying a baseboard management controller disposed in the at least one preselected managed host server system for at least one status signal comprising at least one of central processor unit throttling and memory throttling.

6. The method of claim 1, further comprising:
disconnecting the plug-and-play virtual drive, having the auto-run data gathering executable, from the at least one preselected managed host server system via the plug-and-play virtual media interface between the remote access card and the at least one preselected managed host server system, using the firmware of the remote access card.

7. A method for characterizing server utilization out-of-band via remote access card virtual media, the method comprising:
prompting a user to select at least one desired parameter comprising at least one of at least one performance parameter and at least one process parameter, at least one polling interval, and at least one managed host server system to observe, using a remote application running on a remote management client;

sending the selected at least one desired parameter and the selected at least one polling interval to a remote access card disposed in the selected at least one managed host server system, using the remote application running on the remote management client via at least one remote access card administrative command through an out-of-band dedicated remote access card network interface card;

connecting a plug-and-play virtual drive, having an auto-run data gathering executable, to the selected at least one managed host server system at the selected at least one polling interval via a plug-and-play virtual media interface between the remote access card and the selected at least one managed host server system, using firmware of the remote access card, the plug-and-play virtual drive emulating at least one of a remote drive disposed in the remote management client and a local virtual key disposed in the remote access card;

saving to the remote drive disposed in the remote management client the selected at least one desired parameter from the selected at least one managed host server system at the selected at least one polling interval through a network without completely interrupting the at least one preselected managed host server system, using the auto-run data gathering executable running on the firmware of the remote access card disposed in the at least one preselected managed host server system that writes a performance snapshot text file to the at least one of the remote drive and the local virtual key, wherein the performance snapshot text file comprises at least one result of the collection of the at least one preselected desired parameter;

repeating the saving to the remote drive the selected at least one desired parameter from the selected at least one managed host server system at the selected at least one polling interval, using the auto-run data gathering executable, using firmware of the remote access card until the remote application running on the remote management client sends at least one remote access card administrative command to stop collecting the selected at least one desired parameter from the selected at least one managed host server system;

detecting the performance snapshot text file comprising the at least one result of the collection of the selected at least one desired parameter written to the at least one of the remote drive and the local virtual key, using the remote application;

analyzing at least one trend from the at least one of the spreadsheet and the database to at least one of predict when the selected at least one managed host server system should be scaled, predict at least one impact of at least one upgrade before purchase, do a cost/benefit analysis, and link to a vendor for at least one sales recommendation; and terminating the auto-run data gathering executable running on the firmware of the remote access card.

8. The method of claim 7, further comprising:

using the remote application to copy and parse the performance snapshot text file comprising the at least one result of the collection of the selected at least one desired parameter for at least one relevant field and populate at least one of a spreadsheet and a database for at least one of plotting purposes and analysis purposes.

9. The method of claim 8, wherein analyzing at least one trend includes predicting when the selected at least one managed host server system should be scaled.

10. The method of claim 7, wherein sending the selected at least one desired parameter comprising at least one of the at least one performance parameter and the at least one process parameter to the remote access card disposed in the selected at least one managed host server system further comprises sending the selected at least one desired parameter comprising at least one of a central processing unit utilization parameter, a memory utilization parameter, a disk utilization parameter, and a process monitoring parameter to the remote access card disposed in the selected at least one managed host server system.

11. the method of claim 7, wherein collecting the selected at least one desired parameter from the selected at least one managed host server system at the selected at least one polling interval, using the auto-run data gathering executable further comprises gathering further out-of-band data by querying a baseboard management controller disposed in the selected at least one managed host server system for at least one status signal comprising at least one of central processor unit throttling and memory throttling.

12. The method of claim 7, further comprising:

disconnecting the plug-and-play virtual drive, having the auto-run data gathering executable, from the selected at least one managed host server system via the plug-and-play virtual media interface between the remote access card and the selected at least one managed host server system, using the firmware of the remote access card.

13. A method for characterizing server utilization out-of-band via remote access card virtual media for auto-enterprise scaling, the method comprising:

prompting a user to select at least one desired parameter comprising at least one of at least one performance parameter and at least one process parameter, at least one polling interval, and at least one managed host server system to observe, using a remote application running on a remote management client;

sending the selected at least one desired parameter and the selected at least one polling interval to a remote access card disposed in the selected at least one managed host server system, using the remote application running on the remote management client via at least one remote access card administrative command through an out-of-band dedicated remote access card network interface card;

connecting a plug-and-play virtual drive, having an auto-run data gathering executable, to the selected at least one managed host server system at the selected at least one polling interval via a plug-and-play virtual media interface between the remote access card and the selected at least one managed host server system, using firmware of a service processor and a virtual media engine of the remote access card, the plug-and-play virtual drive emulating at least one of a remote drive disposed in the remote management client and a local virtual key disposed in the remote access card;

saving to the remote drive disposed in the remote management client the selected at least one desired parameter from the selected at least one managed host server system at the selected at least one polling interval through a network without completely interrupting the at least one preselected managed host server system, using the auto-run data gathering executable running on the firmware of the remote access card disposed in the at least one preselected managed host server system that writes a performance snapshot text file to the at least one of the remote drive and the local virtual key, the performance snapshot text file comprising at least one result of the collection of the selected at least one desired parameter;

repeating the saving to the remote drive the selected at least one desired parameter from the selected at least one managed host server system at the selected at least one polling interval without completely interrupting the at least one preselected managed host server system, using the auto-run data gathering executable, using the firmware of the service processor and the virtual media engine of the remote access card until the remote application sends at least one remote access card administrative command to stop collecting the selected at least one desired parameter from the selected at least one managed host server system;

detecting the performance snapshot text file comprising the at least one result of the collection of the selected at least one desired parameter written to the at least one of the remote drive and the local virtual key, using the remote application that copies and parses the performance snapshot text file comprising the at least one result of the collection of the selected at least one desired parameter for at least one relevant field and populates at least one of a spreadsheet and a database for at least one of plotting purposes and analysis purposes; and analyzing at least one trend from the at least one of the spreadsheet and the database to at least one of predict when the selected at least one managed host server system should be scaled, predict at least one impact of at least one upgrade before purchase, do a cost/benefit analysis, and link to a vendor for at least one sales recommendation; and terminating the auto-run data gathering executable running on the firmware of the remote access card.

14. The method of claim 13, further comprising:

disconnecting the plug-and-play virtual drive, having the auto-run data gathering executable, from the selected at least one managed host server system via the plug-and-play virtual media interface between the remote access card and the selected at least one managed host server system, using the firmware of the service processor and the virtual media engine of the remote access card; and replacing the auto-run data gathering executable dynamically, based on at least one performance result, to tweak at least one performance parameter on the selected at least one managed host server system via the plug-and-play virtual media interface between the remote access card and the selected at least one managed host server system to at least one of substantially optimize performance of the selected at least one managed host server system on-the-fly and kill off at least one process in the selected at least one managed host server system that substantially inhibits in-band network access, using the firmware of the service processor and the virtual media engine of the remote access card.

* * * * *